(12) United States Patent
Wakayama et al.

(10) Patent No.: US 9,130,214 B2
(45) Date of Patent: *Sep. 8, 2015

(54) ELECTRODE MATERIAL FOR LITHIUM SECONDARY BATTERY, METHOD FOR PRODUCING THE SAME, AND LITHIUM SECONDARY BATTERY INCLUDING THE SAME

(75) Inventors: Hiroaki Wakayama, Nagoya (JP); Hirotaka Yonekura, Nagoya (JP); Yasuaki Kawai, Nagoya (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 154 days.

This patent is subject to a terminal disclaimer.

(21) Appl. No.: 13/618,626

(22) Filed: Sep. 14, 2012

(65) Prior Publication Data

US 2013/0084501 A1    Apr. 4, 2013

(30) Foreign Application Priority Data

Sep. 16, 2011  (JP) .................................. 2011-202950
Sep. 13, 2012  (JP) .................................. 2012-201932

(51) Int. Cl.
| | | |
|---|---|---|
| *H01M 4/133* | (2010.01) | |
| *H01M 4/1397* | (2010.01) | |
| *H01M 4/13* | (2010.01) | |
| *H01M 4/139* | (2010.01) | |
| *H01M 4/62* | (2006.01) | |
| *H01M 4/485* | (2010.01) | |

(Continued)

(52) U.S. Cl.
CPC .............. *H01M 4/1397* (2013.01); *H01M 4/13* (2013.01); *H01M 4/133* (2013.01); *H01M 4/139* (2013.01); *H01M 4/62* (2013.01); *H01M 4/485* (2013.01); *H01M 4/525* (2013.01); *H01M 4/5825* (2013.01); *Y02E 60/122* (2013.01)

(58) Field of Classification Search
CPC ... H01M 4/133; H01M 4/1397; H01M 10/04; H01F 1/01; H01F 1/12
USPC .......... 429/231.8, 209, 221, 344, 532; 264/49
See application file for complete search history.

(56) References Cited

U.S. PATENT DOCUMENTS 6,972,046 B2 * 12/2005 Sun et al. ......................... 75/348
7,158,346 B2 *  1/2007 Liu et al. ....................... 360/131

(Continued)

FOREIGN PATENT DOCUMENTS

| JP | A-2003-077466 | 3/2003 |
|---|---|---|
| JP | A-2003-77541 | 3/2003 |

(Continued)

OTHER PUBLICATIONS

Machine Translation of: JP 2005/259637A, Yamada et al., Sep. 22, 2005.*

(Continued)

*Primary Examiner* — Kenneth Douyette
(74) *Attorney, Agent, or Firm* — Oliff PLC

(57) ABSTRACT

An electrode material for lithium secondary battery comprises a nanoheterostructure which contains a lithium-ion conductor and an electrode active substance of which one inorganic component is a matrix, and of which the other inorganic component is three-dimensionally and periodically arranged in the matrix, and has a three-dimensional periodic structure whose average value of one unit length of a repeated structure is 1 nm to 100 nm.

13 Claims, 2 Drawing Sheets

(51) Int. Cl.
  *H01M 4/525* (2010.01)
  *H01M 4/58* (2010.01)

(56) References Cited

U.S. PATENT DOCUMENTS

| | | | |
|---|---|---|---|
| 2007/0027015 A1 | 2/2007 | Zhou et al. | |
| 2008/0213674 A1* | 9/2008 | Okada et al. | 429/344 |
| 2008/0233480 A1* | 9/2008 | Sung et al. | 429/220 |
| 2009/0142256 A1 | 6/2009 | Wakayama et al. | |
| 2010/0297537 A1* | 11/2010 | Coors et al. | 429/532 |

FOREIGN PATENT DOCUMENTS

| | | |
|---|---|---|
| JP | A-2004-214116 | 7/2004 |
| JP | A-2005-029779 | 2/2005 |
| JP | A-2005-259637 | 9/2005 |
| JP | A-2005-347211 | 12/2005 |
| JP | A-2009-138014 | 6/2009 |
| WO | WO 2005/047199 A1 | 5/2005 |

OTHER PUBLICATIONS

Hara et al., "Fabrication of all solid-state lithium-ion batteries with three-dimensionally ordered composite electrode consisting of $Li_{0.35}La_{0.55}TiO_3$ and $LiMn_2O_4$," Journal of Power Sciences, 2009, vol. 189, pp. 485-489.

Notification of Reasons for Refusal dated Aug. 5, 2014 from Japanese Patent Application No. 2012-201932 (with English-language translation).

* cited by examiner

■ 20 nm

■ 20 nm

ELECTRODE MATERIAL FOR LITHIUM SECONDARY BATTERY, METHOD FOR PRODUCING THE SAME, AND LITHIUM SECONDARY BATTERY INCLUDING THE SAME

BACKGROUND OF THE INVENTION

1. Field of the Invention

The present invention relates to an electrode material for lithium secondary battery having a nanoheterostructure, a method for producing the same, and a lithium secondary battery including the same.

2. Related Background Art

Lithium secondary batteries have been known as secondary batteries with high energy density, and have conventionally been used as power sources for various electronic instruments. However, conventional lithium secondary batteries do not necessarily have sufficient output characteristics, for example, sufficient discharge capacity. Hence, a lithium secondary battery with higher output characteristics has been desired.

M. Hara et al. discloses, in J. Power Sources, 2009, vol. 189, pp. 485 to 489, a lithium secondary battery comprising, as a positive electrode, a composite material obtained by forming a lithium-ion conductor ($Li_{0.35}La_{0.55}TiO_3$ (LLT)) having an inverse opal structure by a sol-gel method using monodispersed polystyrene beads as a template, and filling the pores of this porous LLT with an electrode material ($LiMn_2O_4$) by a sol-gel method.

SUMMARY OF THE INVENTION

However, the pore diameter of the porous LLT is approximately 2 μm in the LLT-$LiMn_2O_4$ composite material described in the reference. Hence, the area of the reaction interface between the porous LLT and $LiMn_2O_4$ is so small that charge transfer does not occur smoothly at the interface. Therefore, the lithium secondary battery described in the reference does not necessarily exhibit sufficient output characteristics.

The present invention has been made in view of the above-described problem of the conventional technology, and an object of the present invention is to provide an electrode material having a nanostructure, achieving a high utilization ratio as an electrode material for lithium secondary battery, and allowing improvements in output characteristics of a lithium secondary battery, and also to provide a method for producing the electrode material.

The present inventors have earnestly studied in order to achieve the above object. As a result, the present inventors have found that when a first polymer block component constituting a block copolymer is used in combination with one inorganic precursor of a lithium-ion conductor precursor and an electrode active substance precursor, and a second polymer block component is used in combination with the other inorganic precursor of the precursors, a nanophase-separated structure is formed by utilizing self-assembly of the block copolymer. In addition, when the inorganic precursors are converted to a lithium-ion conductor and an electrode active substance, respectively, and the block copolymer is removed, a nanoheterostructure can be obtained which comprises a lithium-ion conductor and an electrode active substance of which one inorganic component is a matrix, and of which the other inorganic component is arranged with a three-dimensional nanoscale periodicity in the matrix. Moreover, the present inventors have found that this nanoheterostructure has a high utilization ratio as an electrode material for lithium secondary battery. These findings have led to the completion of the present invention.

Specifically, a method for producing an electrode material for lithium secondary battery of the present invention comprises:

a first step of preparing a raw material solution by dissolving, in a solvent, a block copolymer comprising at least a first polymer block component and a second polymer block component which are immiscible but linked to each other, a first inorganic precursor which is one of a lithium-ion conductor precursor and an electrode active substance precursor, and a second inorganic precursor which is the other of the lithium-ion conductor precursor and the electrode active substance precursor; and a second step including a phase-separation treatment for forming a nanophase-separated structure in which at least a first polymer phase comprising the first polymer block component with the first inorganic precursor introduced thereinto and a second polymer phase comprising the second polymer block component with the second inorganic precursor introduced thereinto are regularly arranged by self-assembly, a conversion treatment for converting the lithium-ion conductor precursor and the electrode active substance precursor to a lithium-ion conductor and an electrode active substance, respectively, and a removal treatment for removing the block copolymer from the nanophase-separated structure, to thereby obtain an electrode material having a nanoheterostructure comprising the lithium-ion conductor and the electrode active substance.

A solubility parameter difference between the first inorganic precursor and the first polymer block component used in the present invention is preferably 2 $(cal/cm^3)^{1/2}$ or less, and a solubility parameter difference between the second inorganic precursor and the second polymer block component used in the present invention is preferably 2 $(cal/cm^3)^{1/2}$ or less.

Further, a solubility parameter difference between the first polymer block component and the first inorganic precursor used in the present invention is preferably smaller than a solubility parameter difference between the first polymer block component and the second inorganic precursor. Moreover, a solubility parameter difference between the second polymer block component and the second inorganic precursor is preferably smaller than a solubility parameter difference between the second polymer block component and the first inorganic precursor.

When the block copolymer used in the present invention comprises at least one first polymer block component and at least one second polymer block component which are linked to each other, the first polymer block component being selected from the group consisting of a polystyrene component, a polyisoprene component, and a polybutadiene component, the second polymer block component being selected from the group consisting of a poly(methyl methacrylate) component, a poly(ethylene oxide) component, a polyvinylpyridine component, and a poly(acrylic acid) component, the first inorganic precursor is preferably at least one of organometallic compounds and organometalloidal compounds having at least one structure selected from the group consisting of a phenyl group, long hydrocarbon chains having 5 or more carbon atoms, a cyclooctatetraene ring, a cyclopentadienyl ring, and an amino group, and the second inorganic precursor is preferably at least one selected from the group consisting of salts of metals or metalloids, metal- or metalloid-containing alkoxides having 1 to 4 carbon atoms, and metal or metalloid acetylacetonate complexes.

Meanwhile, an electrode material for lithium secondary battery of the present invention is made obtainable by the production method of the present invention comprises a nanoheterostructure which contains a lithium-ion conductor and an electrode active substance of which one inorganic component is a matrix, and of which the other inorganic component is three-dimensionally and periodically arranged in the matrix, and has a three-dimensional periodic structure whose average value of one unit length of a repeated structure is 1 nm to 100 nm.

In the electrode material for lithium secondary battery of the present invention, the inorganic component three-dimensionally and periodically arranged in the matrix preferably has a shape selected from the group consisting of a columnar shape, a lamellar shape, and a gyroid shape.

Moreover, the lithium-ion conductor is preferably at least one selected from the group consisting of sulfide-based lithium-ion conductors, garnet-type lithium-ion conductors, LISICON-type lithium-ion conductors, NASICON-type lithium-ion conductors, and perovskite-type lithium-ion conductors.

Further, the electrode active substance is preferably at least one positive electrode active substance selected from the group consisting of oxide-based positive electrode active substances and olivine-type positive electrode active substances, or at least one negative electrode active substance selected from the group consisting of oxide-based negative electrode active substances, carbon-based negative electrode active substances, and metal-based negative electrode active substances.

A lithium secondary battery of the present invention comprises such an electrode material as at least one of a positive electrode material and a negative electrode material. In the lithium secondary battery of the present invention, both the positive electrode material and the negative electrode material are particularly preferably the electrode material of the present invention.

It should be noted that although it is not known exactly why the electrode material for lithium secondary battery of the present invention having the nanoheterostructure can be obtained by the method of the present invention, the present inventors speculate as follows. Specifically, first, a block copolymer comprising two kinds of polymer block components A and B which are immiscible but linked to each other forms a nanophase-separated structure in which a phase A and a phase B are spatially separate from each other (self-assembly) by being subjected to a heat treatment at or above a glass transition temperature. Here, the phase-separated structure generally varies depending on the molecular weight ratio of the polymer block components. Specifically, when the molecular weight ratio of A:B is 1:1, generally a layered lamellar structure is formed. As the molecular weight ratio changes from 1:1, the structure changes from a gyroid structure in which two continuous phases are mingled with each other, to a columnar structure, and further to a spherical structure. Note that FIG. 1 is a schematic diagram showing nanophase-separated structures generated from block copolymers. Shown from the left are a lamellar structure (a), a gyroid structure (b), a columnar structure (c), and a spherical structure (d). Generally, the proportion of A in the structure on the right is higher.

In the method for producing an electrode material for lithium secondary battery of the present invention, first, multiple inorganic precursors are arranged with a three-dimensional nanoscale periodicity by utilizing the self-assembly of the block copolymer. Specifically, a block copolymer comprising multiple polymer block components which are immiscible with each other undergoes phase separation on a nanoscale by self-assembly as described above. Here, in the present invention, it is preferable to use a first polymer block component constituting a block copolymer in combination with a first inorganic precursor which is one of a lithium-ion conductor precursor and an electrode active substance precursor, and to use a second polymer block component in combination with a second inorganic precursor which is the other of the lithium-ion conductor precursor and the electrode active substance precursor. Moreover, it is preferable to use a first inorganic precursor having a solubility parameter different from that of the first polymer block component by 2 $(cal/cm^3)^{1/2}$ or less in combination with a second inorganic precursor having a solubility parameter different from that of the second polymer block component by 2 $(cal/cm^3)^{1/2}$ or less. Thereby, a nanophase-separated structure is formed with achievement of self-assembly of the block copolymer, while the first inorganic precursor and the second inorganic precursor are sufficiently introduced into the first polymer block component and the second polymer block component, respectively. As the nanophase-separated structure is made to have a specific structure, the inorganic precursors are arranged with a three-dimensional nanoscale periodicity.

Further, in the present invention, the lithium-ion conductor precursor and the electrode active substance precursor are converted to a lithium-ion conductor and an electrode active substance, respectively, and the block copolymer is removed. Thereby, an electrode material having a nanoheterostructure is obtained which comprises a lithium-ion conductor and an electrode active substance of which one inorganic component is a matrix, and of which the other inorganic component is arranged with a three-dimensional specific nanoscale periodicity in the matrix, depending on the shape of the nanophase-separated structure. Note that, in the present invention, the first inorganic precursor and the second inorganic precursor are used in combination with the first polymer block component and the second polymer block component, respectively. Further, the solubility parameter difference of each combination is preferably 2 $(cal/cm^3)^{1/2}$ or less. Thereby, sufficiently large amounts of the inorganic precursors are introduced into the polymer block components, respectively. The present inventors speculate that, for this reason, the three-dimensional nanoscale periodic structure is sufficiently kept, even when the lithium-ion conductor precursor and the electrode active substance precursor are converted to the lithium-ion conductor and the electrode active substance, respectively, and the block copolymer is removed.

Note that, in the present invention, the "solubility parameter" is a so-called "SP value" defined by the regular solution theory introduced by Hildebrand, and is a value obtained based on the following equation:

$$\text{Solubility parameter } \delta[(cal/cm^3)^{1/2}] = (\Delta E/V)^{1/2}$$

(where $\Delta E$ represents molar energy of vaporization [cal], and V represents a molar volume [$cm^3$]).

Moreover, in the present invention, the "average value of one unit length of a repeated structure" is an average value of a distance between the centers of adjacent pieces of one inorganic component arranged in a matrix comprising the other inorganic component, and corresponds to a distance (d) of a so-called periodic structure. The distance (d) of such a periodic structure can be obtained by small-angle X-ray diffraction as described below. Moreover, the structure such as a spherical structure, a columnar structure, a gyroid structure, or a lamellar structure according to the present invention can also be specified by a characteristic diffraction pattern measured by small-angle X-ray diffraction as described below.

Specifically, by small-angle X-ray diffraction, Bragg reflection is observed from characteristic lattice planes of a pseudo-crystalline lattice in which a structure having a shape such as a spherical shape, a columnar shape, a gyroid shape, or a lamellar shape is periodically arranged in a matrix. Here, if a periodic structure is formed, diffraction peaks are observed, and a structure such as a spherical structure, a columnar structure, a gyroid structure, or a lamellar structure can be identified from the ratio of the magnitudes ($q=2\pi/d$) of these diffraction spectra. Moreover, from the peak position of such a diffraction peak, the distance (d) of the periodic structure can be calculated according to Bragg's equation ($n\lambda=2d \sin\theta$; $\lambda$ represents the wavelength of an X-ray, and $\theta$ represents a diffraction angle). Table 1 below shows the relation between each structure and the ratio of magnitudes (q) of diffraction spectra at peak positions. Note that all the peaks shown in Table 1 do not necessary have to be observed, as long as the structure can be identified from the observed peaks.

TABLE 1

| Structure | Ratio of q at peak positions |
|---|---|
| sphere | $1:\sqrt{2}:\sqrt{3}:\sqrt{4}:\ldots$ |
| column | $1:\sqrt{3}:\sqrt{4}:\sqrt{7}:\ldots$ |
| gyroid | $1:\sqrt{4/3}:\sqrt{7/3}:\sqrt{8/3}:\ldots$ |
| layer | $1:2:3:4:\ldots$ |

Further, it is also possible to identify the structure such as a spherical structure, a columnar structure, a gyroid structure, or a lamellar structure according to the present invention by using a transmission electron microscope (TEM) with which the shape and the periodicity can be determined and evaluated. Further, it is possible to determine the three-dimensionality more specifically by observations made in different directions, or by using three-dimensional tomography.

The present invention makes it possible to obtain an electrode material which comprises a nanoheterostructure containing a lithium-ion conductor and an electrode active substance of which one inorganic component is a matrix, and of which the other inorganic component is arranged with a three-dimensional nanoscale periodicity in the matrix, and which achieves a high utilization ratio as an electrode material for lithium secondary battery.

DETAILED DESCRIPTION OF THE PREFERRED EMBODIMENTS

Figure 1:
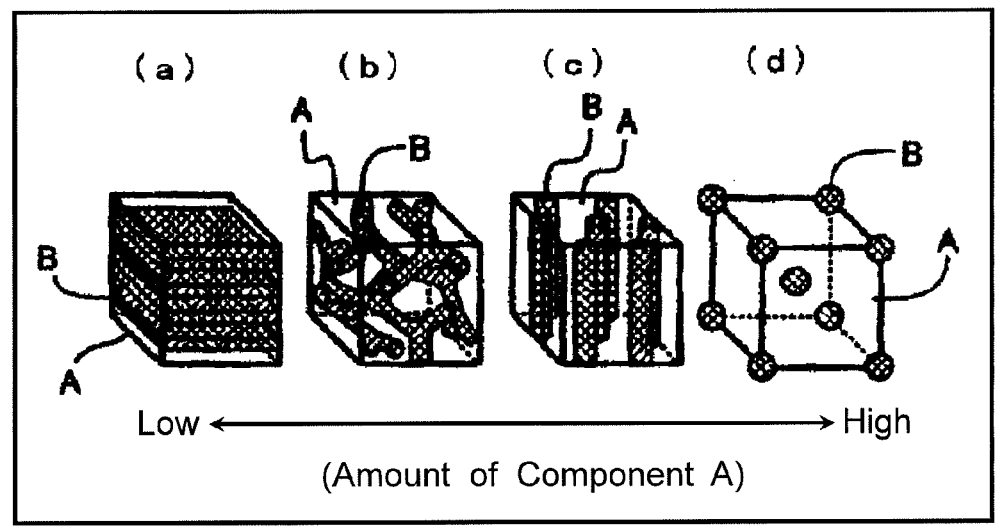
FIG. 1 is a schematic diagram illustrating nanophase-separated structures generated from A-B type block copolymers.

Hereinafter, the present invention will be described in detail on the basis of preferred embodiments thereof.

First, an electrode material for lithium secondary battery of the present invention is described. The electrode material for lithium secondary battery of the present invention comprises a nanoheterostructure which contains a lithium-ion conductor and an electrode active substance of which one inorganic component is a matrix, and of which the other inorganic component is three-dimensionally and periodically arranged in the matrix, and has a three-dimensional periodic structure whose average value of one unit length of a repeated structure is 1 nm to 100 nm (more preferably 1 nm to 50 nm, and particularly preferably 1 to 30 nm).

The electrode material for lithium secondary battery of the present invention has a nanostructure, such as a spherical structure, a columnar structure, a gyroid structure, or a lamellar structure (preferably, a columnar structure, a gyroid structure, or a lamellar structure), that has not been formed by conventional production methods. It is possible to obtain those having a nanoheterostructure in which the arrangement, composition, structure scale, and the like of various combinations of the lithium-ion conductor and the electrode active substance are controlled in various ways. Therefore, the electrode material for lithium secondary battery of the present invention exhibits an interface increasing effect, a nanosize effect, and significant improvements in durability and the like, and consequently makes it possible to improve the utilization ratio as an electrode material for lithium secondary battery. Moreover, the electrode material for lithium secondary battery of the present invention has a large reaction interface area owing to the nanostructure, and allows charge transfer to occur smoothly, resulting in improvement in output characteristics. As a result, a lithium secondary battery including such an electrode material exhibits significant improvements in storage battery characteristics.

The lithium-ion conductor constituting the electrode material for lithium secondary battery of the present invention is not particularly limited, as long as the lithium-ion conductor is an inorganic component having lithium-ion conductivity. For example, preferred are sulfide-based lithium-ion conductors (such as $Li_2S-P_2S_5$) garnet-type lithium-ion conductors ($Li_{7-x}La_3Zr_{2-x}Nb_xO_{12}$), LISICON-type lithium-ion conductors (such as $Li_{14}Zn(GeO_4)_4$), NASICON-type lithium-ion conductors (such as $Li_{1.3}Al_{0.3}Ti_{1.7}(PO_4)_3$), and perovskite-type lithium-ion conductors (such as $Li_{0.51}La_{0.34}TiO_{2.94}$). One kind of such lithium-ion conductors may be used alone, or two or more kinds thereof may be used in combination.

Meanwhile, the electrode active substance constituting the electrode material for lithium secondary battery of the present invention may be a positive electrode active substance or a negative electrode active substance. The positive electrode active substance is not particularly limited, but preferred examples thereof include oxide-based positive electrode active substances (such as $LiCoO_2$, $LiNiO_2$, $LiMn_2O_4$, and active substances obtained by partially substituting the Co atoms, Ni atoms, or Mn atoms constituting the foregoing with other atoms), and olivine-type positive electrode active substances (such as $LiFePO_4$). Meanwhile, the negative electrode active substance is not particularly limited, but preferred examples thereof include oxide-based negative electrode active substances (such as $Li_4Ti_5O_{12}$), carbon-based negative electrode active substances (such as graphite), and metal-based negative electrode active substances (such as metals capable of forming an alloy with Li (for example, Sn, Al, Ge, Si, and Pb) and alloys of the metal with Li). One kind of these positive electrode active substances or negative electrode active substances may be used alone, or two or more kinds thereof may be used in combination.

In the electrode material for lithium secondary battery of the present invention, any one of the lithium conductor and the electrode active substance may form the matrix of the nanoheterostructure. However, the electrode active substance preferably forms the matrix, from the viewpoint that the charge-discharge capacity per volume or mass of the electrode material is maximized. In addition, the thickness of the electrode material is not particularly limited. However, the thickness is preferably 1 to 100 µm, from the viewpoint that too small a thickness leads to decrease in proportion of the electrode in the entire battery, resulting in a small capacity, while too large a thickness leads to increase in electrode resistance, resulting in decrease in strength of the electrode. Moreover, a cross-sectional diameter of the inorganic component three-dimensionally and periodically arranged in the matrix is preferably 5 to 90 nm, from the viewpoint that too small a cross-sectional diameter makes it difficult to form a conduction path, while too large a cross-sectional diameter leads to decrease in interface area.

Next, a method for producing such an electrode material for lithium secondary battery of the present invention is described. The method for producing an electrode material for lithium secondary battery of the present invention comprises:

a first step of preparing a raw material solution by dissolving, in a solvent,
  a block copolymer comprising at least a first polymer block component and a second polymer block component which are immiscible but linked to each other,
  a first inorganic precursor which is one of a lithium-ion conductor precursor and an electrode active substance precursor, and
  a second inorganic precursor which is the other of the lithium-ion conductor precursor and the electrode active substance precursor; and a second step including
  a phase-separation treatment for forming a nanophase-separated structure in which at least a first polymer phase comprising the first polymer block component with the first inorganic precursor introduced thereinto and a second polymer phase comprising the second polymer block component with the second inorganic precursor introduced thereinto are regularly arranged by self-assembly,
  a conversion treatment for converting the lithium-ion conductor precursor and the electrode active substance precursor to a lithium-ion conductor and an electrode active substance, respectively, and
  a removal treatment for removing the block copolymer from the nanophase-separated structure, to thereby obtain an electrode material having a nanoheterostructure comprising the lithium-ion conductor and the electrode active substance. Hereinafter, each of the steps is described.

[First Step: Raw Material Solution Preparation Step]

This step is a step of preparing a raw material solution by dissolving, in a solvent, a block copolymer described below and inorganic precursors described below.

The block copolymer used in the present invention comprises at least a first polymer block component and a second polymer block component which are linked to each other. Specific examples of such a block copolymer include A-B type and A-B-A type block copolymers having a structure such as -(aa . . . aa)-(bb . . . bb)- in which a polymer block component A (first polymer block component) having a repeating unit a and a polymer block component B (second polymer block component) having a repeating unit b are linked end to end. Moreover, the block copolymer may be of a star type in which at least one polymer block component extends radially from a center, or of a type in which another polymer component is branched from the main chain of the block copolymer.

The kinds of the polymer block components constituting the block copolymer used in the present invention are not particularly limited, as long as the polymer block components are immiscible with each other. Thus, the block copolymer used in the present invention preferably comprises polymer block components having different polarities. Specific examples of such a block copolymer include polystyrene-poly(methyl methacrylate) (PS-b-PMMA), polystyrene-poly(ethylene oxide) (PS-b-PEO), polystyrene-polyvinylpyridine (PS-b-PVP), polystyrene-poly(ferrocenyldimethylsilane) (PS-b-PFS), polyisoprene-poly(ethylene oxide) (PI-b-PEO), polybutadiene-poly(ethylene oxide) (PB-b-PEO), poly(ethyl ethylene)-poly(ethylene oxide) (PEE-b-PEO), polybutadiene-polyvinylpyridine (PB-b-PVP), polyisoprene-poly(methyl methacrylate) (PI-b-PMMA), polystyrene-poly(acrylic acid) (PS-b-PAA), polybutadiene-poly(methyl methacrylate) (PB-b-PMMA), and the like. Above all, PS-b-PVP, PS-b-PEO, PS-b-PAA, and the like are preferable from the viewpoint that precursors are likely to be introduced into the respective polymer block components. This is because if the polymer block components greatly differ from each other in polarity, precursors which greatly differ from each other in polarity can also be used for the introduction.

The molecular weights of the block copolymer and the polymer block components constituting the block copolymer can be selected as appropriate in accordance with the nanostructure scale (the sizes and distance of spheres, columns, or the like) and the arrangement of an electrode material for lithium secondary battery to be produced. For example, it is preferable to use a block copolymer having a number average molecular weight of 100 to 10,000,000 (more preferably 1,000 to 1,000,000). There is a tendency that the lower the number average molecular weight, the smaller the nanostructure scale. Moreover, with regard to the number average molecular weight of each of the polymer block components, by adjusting the molecular weight ratio of the polymer block components, a nanophase-separated structure to be obtained by self-assembly in the subsequent nanophase-separated structure-forming step can have a desired structure. Accordingly, an electrode material for lithium secondary battery having a nanoheterostructure in which the inorganic components are arranged in a desired form can be obtained. It is also preferable to use a block copolymer which is easily decomposed by a heat treatment (calcination) or light irradiation to be described later, or a block copolymer which is easily removed with a solvent.

The lithium-ion conductor precursor and the electrode active substance precursor used in the present invention are not particularly limited, as long as the electrode active substance precursors are inorganic precursors capable of forming the above-described lithium-ion conductor and electrode active substance, respectively, by the conversion treatment to be described later. Specifically, preferred are salts of a metal or metalloid constituting the lithium-ion conductor or the electrode active substance (for example, carbonates, nitrates, phosphates, sulfates, acetates, chlorides, organic acid salts (such as acrylates)), alkoxides having 1 to 4 carbon atoms and containing the metal or the metalloid (for example, methoxides, ethoxides, propoxides, and butoxides), complexes of the metal or the metalloid (for example, acetylacetonate complexes), and organometallic compounds or organometalloidal compounds containing the metal or the metalloid (for example, those having at least one structure selected from the group consisting of a phenyl group, long hydrocarbon chains having 5 or more carbon atoms, a cyclooctatetraene ring, a cyclopentadienyl ring, and an amino group). One kind or two or more kinds of such lithium-ion conductor precursors and one kind or two or more kinds of such electrode active substance precursors are selected as appropriate for use, in accordance with the combination of the lithium-ion conductor and the electrode active substance constituting the electrode material for lithium secondary battery having a desired nanoheterostructure, so that the precursors satisfy the above-described various conditions.

The solvent used in the present invention is not particularly limited, as long as the solvent is capable of dissolving the block copolymer and the first and second inorganic precursors to be used. Examples of the solvent include acetone, tetrahydrofuran (THF), toluene, propylene glycol monomethyl ether acetate (PGMEA), propylene glycol monomethyl ether (PGME), chloroform, benzene, and the like. One kind of such solvents can be used alone, or a mixture of two or more kinds thereof can be used.

Note that, in the present description, "to dissolve" means a phenomenon that a substance (solute) is dissolved in a solvent to form a homogeneous mixture (solution), and includes cases where after dissolving, at least part of the solute becomes ions, where the solute is not dissociated into ions, but exists as molecules, and where the solute exists as associated molecules or ions, and other cases.

In the present invention, the first polymer block component is used in combination with the first inorganic precursor, which is one of the lithium-ion conductor precursor and the electrode active substance precursor, and the second polymer block component is used in combination with the second inorganic precursor, which is the other of the precursors. Moreover, it is preferable to use a first inorganic precursor having a solubility parameter different from that of the first polymer block component by 2 $(\text{cal/cm}^3)^{1/2}$ or less in combination with a second inorganic precursor having a solubility parameter different from that of the second polymer block component by 2 $(\text{cal/cm}^3)^{1/2}$ or less. By using the first inorganic precursor and the second inorganic precursor satisfying such conditions in combination, in the step of forming the nanophase-separated structure described later, a nanophase-separated structure is formed with achievement of self-assembly of the block copolymer, while the first inorganic precursor and the second inorganic precursor are sufficiently introduced into the first polymer block component and the second polymer block component, respectively. Thereby, the inorganic precursors are arranged with a three-dimensional nanoscale periodicity.

A solubility parameter difference between the first polymer block component and the first inorganic precursor used in the present invention is preferably smaller than a solubility parameter difference between the first polymer block component and the second inorganic precursor. Meanwhile, a solubility parameter difference between the second polymer block component and the second inorganic precursor is preferably smaller than a solubility parameter difference between the second polymer block component and the first inorganic precursor. Moreover, it is more preferable to satisfy both the conditions.

Moreover, the first inorganic precursor used in the present invention preferably has a solubility parameter different from that of the second polymer block component by more than 2 $(\text{cal/cm}^3)^{1/2}$. Meanwhile, the second inorganic precursor preferably has a solubility parameter different from that of the first polymer block component by more than 2 $(\text{cal/cm}^3)^{1/2}$. Furthermore, it is more preferable to satisfy both the conditions.

By using the first inorganic precursor and the second inorganic precursor satisfying such conditions in combination, a part of the second inorganic precursor and a part of the first inorganic precursor tend to be more surely prevented from being introduced as impurities into the first polymer block component and the second polymer block component, respectively, in the step of forming the nanophase-separated structure described later. Moreover, the purity of the inorganic component constituting the matrix and/or the purity of the inorganic component arranged in the matrix in an electrode material for lithium secondary battery having a nanoheterostructure to be obtained tend to be more improved.

Preferred combinations of the first and second polymer block components and the first and second inorganic precursors satisfying such conditions are those in which the first polymer block component is at least one low-polarity polymer block component selected from the group consisting of a polystyrene component, a polyisoprene component, and a polybutadiene component; the second polymer block component is at least one high-polarity polymer block component selected from the group consisting of a poly(methyl methacrylate) component, a poly(ethylene oxide) component, a polyvinylpyridine component, and a poly(acrylic acid) component; the first inorganic precursor is at least one low-polarity inorganic precursor selected from the group consisting of the above-described organometallic compounds and organometalloidal compounds; and the second inorganic precursor is at least one high-polarity inorganic precursor selected from the group consisting of the salts of the metal or the metalloid, the alkoxides having 1 to 4 carbon atoms and containing the metal or the metalloid, and the acetylacetonate complexes of the metal or the metalloid.

In addition, preferably at least one (more preferably both) of the first inorganic precursor and the second inorganic precursor has a solubility parameter different from that of the solvent used by 2 $(\text{cal/cm}^3)^{1/2}$ or less. By using the first inorganic precursor and/or the second inorganic precursor satisfying such a condition, the inorganic precursor tends to be more surely dissolved in the solvent, and the inorganic precursor tends to be more surely introduced into the polymer block component in the step of forming the nanophase-separated structure described later.

The ratios of the solutes (the block copolymer, the first inorganic precursor, and the second inorganic precursor) in the obtained raw material solution are not particularly limited. When a total amount of the raw material solution is taken as 100% by mass, the total amount of the solutes is preferably around 0.1 to 30% by mass, and more preferably 0.5 to 10% by mass. Further, by adjusting the amounts of the first and second inorganic precursors used relative to the block copolymers, the amount of each inorganic precursor introduced into the polymer block component is adjusted, so that the ratio, structure scale (the sizes and distance of spheres, columns, or the like) and the like of the lithium-ion conductor and the electrode active substance in an electrode material for lithium secondary battery having a nanoheterostructure to be obtained can be at desired levels.

[Second Step: Electrode Material-Forming Step]

This step is a step including a phase-separation treatment, a conversion treatment, and a removal treatment, which are to be described in detail below, to thereby prepare an electrode material having a nanoheterostructure comprising a lithium-ion conductor and an electrode active substance.

First, the raw material solution prepared in the first step contains the block copolymer, the lithium-ion conductor precursor, and the electrode active substance precursor. In the present invention, it is preferable to use the first polymer block component in combination with the first inorganic precursor, which is one of the lithium-ion conductor precursor and the electrode active substance precursor, and to use the second polymer block component in combination with the second inorganic precursor, which is the other of the precursors. Moreover, it is further preferable to use the first inorganic precursor having a solubility parameter different from that of the first polymer block component by 2 $(cal/cm^3)^{1/2}$ or less in combination with the second inorganic precursor having a solubility parameter different from that of the second polymer block component by 2 $(cal/cm^3)^{1/2}$ or less. Accordingly, the first inorganic precursor and the second inorganic precursor exist in such a state that the first and second inorganic precursors are sufficiently introduced into the first polymer block component and the second polymer block component, respectively. Hence, by the phase-separation treatment for forming a nanophase-separated structure by self-assembly of the block copolymer, a first polymer phase comprising the first polymer block component with the first inorganic precursor introduced thereinto and a second polymer phase comprising the second polymer block component with the second inorganic precursor introduced thereinto are regularly arranged, and the inorganic precursors are arranged with a three-dimensional nanoscale periodicity.

Such a phase-separation treatment is not particularly limited. By carrying out a heat treatment at or above a glass transition temperature of the block copolymer used, self-assembly of the block copolymer is achieved, and the phase-separated structure is obtained.

Next, in the present invention, the nanophase-separated structure formed by the phase-separation treatment is subjected to the conversion treatment for converting the lithium-ion conductor precursor and the electrode active substance precursor to a lithium-ion conductor and an electrode active substance, respectively; and the removal treatment for removing the block copolymer from the nanophase-separated structure. The lithium-ion conductor precursor and the electrode active substance precursor are converted to the lithium-ion conductor and the electrode active substance, respectively, by such a conversion treatment, and the block copolymer is removed by such a removal treatment. Thereby, an electrode material for lithium secondary battery having a nanoheterostructure of the present invention is obtained which comprises the lithium-ion conductor and the electrode active substance of which one inorganic component is a matrix, and of which the other inorganic component is arranged with a three-dimensional specific nanoscale periodicity in the matrix in such a shape as a spherical shape, a columnar shape, a gyroid shape, or a lamellar shape (preferably, a columnar shape, a gyroid shape, or a lamellar shape), in accordance with the type (shape) of the nanophase-separated structure.

Such a conversion treatment may be a step of heating at or above a temperature at which the inorganic precursors are converted to the inorganic components for conversion to the inorganic components; or a step of subjecting the inorganic precursors to hydrolysis and dehydration condensation for conversion to the inorganic components.

Moreover, the removal treatment may be a step of decomposing the block copolymer by a heat treatment (calcination) at or above a temperature at which the block copolymer is decomposed; a step of removing the block copolymer by dissolving the block copolymer in a solvent; or a step of decomposing the block copolymer by light irradiation such as ultraviolet ray irradiation.

Further, in the second step of the present invention, if the raw material solution prepared in the first step is subjected to a heat treatment (calcination) at or above a temperature at which the block copolymer is decomposed, the phase-separation treatment, the conversion treatment, and the removal treatment can be conducted all in one heat treatment. In order to complete the phase-separation treatment, the conversion treatment, and the removal treatment by only one heat treatment in this manner, the heat treatment is carried out preferably at 300 to 1200° C. (more preferably 400 to 900° C.) for approximately 0.1 to 50 hours, although the conditions vary depending on the kinds of the block copolymer and the inorganic precursors to be used.

Such a heat treatment may be carried out in an inert gas atmosphere (for example, in nitrogen gas or the like), in an oxidizing gas atmosphere (for example, in the air or the like), or in a reducing gas atmosphere (for example, in hydrogen or the like). When the inorganic precursors are converted to the inorganic components and the block copolymer is removed in an inert gas atmosphere, the three-dimensional nanoscale periodic structure tends to be kept more surely. Meanwhile, when the inorganic precursors are converted to the inorganic components in an oxidizing gas atmosphere, an electrode material including a lithium-ion conductor and an electrode active substance each comprising an oxide of a metal or a metalloid can be obtained. Further, when the inorganic precursors are converted to the inorganic components in a reducing gas atmosphere, an electrode material including a lithium-ion conductor and an electrode active substance each comprising a metal or a metalloid can be obtained. The conditions of such a heat treatment in an inert gas atmosphere, an oxidizing gas atmosphere, or a reducing gas atmosphere are not particularly limited. The treatment is preferably carried out at 300 to 1200° C. (more preferably 400 to 900° C.) for approximately 0.1 to 50 hours.

Additionally, after the heat treatment or during the heat treatment, it is possible to further carry out a carbonization treatment on the inorganic components using an argon atmosphere or the like, a nitrogenization treatment on the inorganic components using an ammonia atmosphere or the like, a boronization treatment on the inorganic components using a boron carbide-containing atmosphere or the like, or other treatment by a known method for each treatment.

After the first step, the second step may be performed on the raw material solution introduced into a heat treatment container, or the second step may be performed after the raw material solution is applied onto a surface of a substrate, in the method for producing an electrode material for lithium secondary battery of the present invention. By the latter method, a film-shaped electrode material for lithium secondary battery can be directly formed on the surface of the substrate. The kind of the substrate used is not particularly limited, but may be selected as appropriate depending on the application of the electrode material for lithium secondary battery to be obtained. Moreover, brush painting, a spray method, a dipping method, a spin method, curtain flow, or the like is used as a method for applying the raw material solution.

Next, a lithium secondary battery of the present invention is described. The lithium secondary battery of the present invention includes the electrode material of the present invention as at least one of a positive electrode material and a negative electrode material. A particularly preferable lithium secondary battery is such that the positive electrode material and the negative electrode material are each the electrode material of the present invention, from the viewpoint that high output characteristics are exhibited. Specifically, the lithium secondary battery of the present invention is a lithium secondary battery in which an electrolyte is sandwiched between the electrode material of the present invention and a counter electrode.

Figure 2:
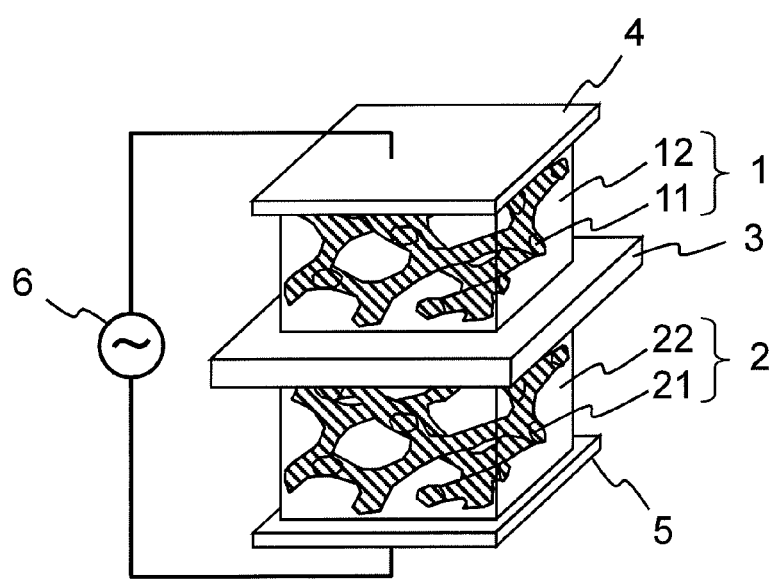
FIG. 2 is a schematic diagram showing an example of a preferred embodiment of a lithium secondary battery of the present invention.

When the electrode material of the present invention is used as a positive electrode material in the lithium secondary battery of the present invention, a known negative electrode material for lithium secondary battery can be used as the counter electrode. Meanwhile, when the electrode material of the present invention is used as a negative electrode material, a known positive electrode material for lithium secondary battery can be used as the counter electrode. Further, as shown in FIG. 2, the electrode materials of the present invention may be used for both of the positive electrode material and the negative electrode material, and the electrolyte may be sandwiched between these electrode materials. Note that the reference numerals 1 to 22 in FIG. 2 denote the following: 1: positive electrode material, 2: negative electrode material, 3: electrolyte, 4 and 5: charge collectors, 6: external electrical apparatus, 11 and 21: lithium-ion conductors, 12: positive electrode active substance, and 22: negative electrode active substance. Such a lithium secondary battery exhibits high output characteristics, because the electrode materials of the present invention having a high utilization ratio as an electrode material are used for both of the positive electrode material and the negative electrode material. Note that the electrode material of the present invention can be used as either a positive electrode material or a negative electrode material for lithium secondary battery, by selecting the electrode active substance as appropriate. Moreover, the electrolyte is not particularly limited, and a known electrolyte for lithium secondary battery can be used.

EXAMPLES

Hereinafter, the present invention will be described more specifically on the basis of Examples and Comparative Examples. However, the present invention is not limited to Examples below.

Example 1

A raw material solution was obtained by dissolving, in 10 mL of tetrahydrofuran (THF), 0.1 g of polystyrene-b-poly(4-vinylpyridine) (PS-b-P4VP, the number average molecular weight of the PS component: $400\times10^3$, the number average molecular weight of the P4VP component: $180\times10^3$) as a block copolymer, 0.037 g of lithium acrylate ($CH_2$=CHCOOLi), 0.150 g of lanthanum acetate (La($CH_3$COO)$_3$), and 0.138 g of cyclopentadienyl titanium chloride (Ti(CPD)Cl$_3$) as a $Li_{0.5}La_{0.5}TiO_3$ precursor (a Li precursor, a La precursor, and a Ti precursor), which was a lithium-ion conductor precursor, and 0.048 g of lithium phenoxide (PhOLi) and 0.274 g of cobalt phthalocyanine (CoPC) as a $LiCoO_2$ precursor (a Li precursor and a Co precursor), which was a positive electrode active substance precursor.

Next, the obtained raw material solution was placed in a heat treatment container, and subjected to a heat treatment in an air stream at 650° C. for 3 hours. Thus, an inorganic structure (1 cm in diameter×10 μm) was obtained.

Figure 3:
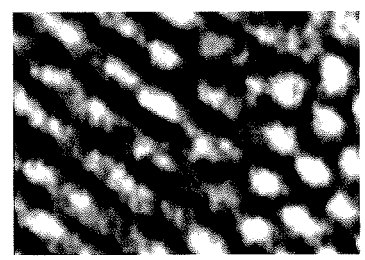
FIG. 3 is a transmission electron microphotograph of an electrode material (nanoheterostructure) for lithium secondary battery obtained in Example 1.

The obtained inorganic structure was observed with a transmission electron microscope (TEM). As shown in FIG. 3, a nanoheterostructure was confirmed in which columnar $LiCoO_2$ as a positive electrode active substance was three-dimensionally and periodically arranged in a $Li_{0.5}La_{0.5}TiO_3$ matrix as a lithium-ion conductor.

Further, the small-angle X-ray diffraction pattern of the obtained inorganic structure was measured with a small-angle X-ray diffraction measuring device (manufactured by Rigaku Corporation, product name: NANO-Viewer). The distance (d) of the periodic structure was 24.4 nm, and a diffraction peak pattern characteristic to a columnar structure (i.e., the ratio of magnitudes (q) of the diffraction spectra at peak positions) was confirmed.

A battery cell was fabricated by sandwiching a poly(methyl methacrylate) (PMMA) gel electrolyte (1.4 cm in diameter×2 μm) between this nanoheterostructure used as a positive electrode material and lithium metal foil (1 cm in diameter×400 μm) used as a negative electrode material. The discharge capacity of the obtained battery cell, which was charged with constant current and constant voltage, was measured in the range of 3 V to 4.2 V. From the theoretical value and the actual measurement value of the discharge capacity, the utilization ratio of the nanoheterostructure as a positive electrode material was found to be 96%.

Example 2

An inorganic structure (1 cm in diameter×8 μm) was fabricated in the same manner as in Example 1, except that 0.1 g of PS-b-P4VP whose PS component had a number average molecular weight of $340\times10^3$ and whose P4VP component had a number average molecular weight of $170\times10^3$ was used as a block copolymer, and that 0.048 g of lithium phenoxide (PhOLi) and 0.284 g of titanium phthalocyanine (TiPC) were used as a $Li_4Ti_5O_{12}$ precursor (a Li precursor and a Ti precursor), which was a negative electrode active substance precursor, instead of the positive electrode active substance precursor.

Figure 4:
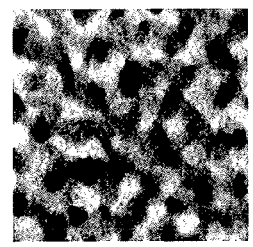
FIG. 4 is a transmission electron microphotograph of an electrode material (nanoheterostructure) for lithium secondary battery obtained in Example 2.

The obtained inorganic structure was observed with a transmission electron microscope (TEM) in the same manner as in Example 1. As shown in FIG. 4, a nanoheterostructure was confirmed in which gyroid $Li_4Ti_5O_{12}$ as a negative electrode active substance was three-dimensionally and periodically arranged in a $Li_{0.5}La_{0.5}TiO_3$ matrix as a lithium-ion conductor.

Further, the small-angle X-ray diffraction pattern of the obtained inorganic structure was measured in the same manner as in Example 1. The distance (d) of the periodic structure was 21.7 nm, and a diffraction peak pattern characteristic to a gyroid structure (the ratio of magnitudes (q) of the diffraction spectra at peak positions) was confirmed.

A battery cell was fabricated by sandwiching a PMMA gel electrolyte (1.4 cm in diameter×2 μm) between this nanoheterostructure and lithium metal foil (1 cm in diameter×400 μm) used as a counter electrode. The discharge capacity of the obtained battery cell was measured in the same manner as in Example 1, except that the measurement range was changed to the range from 1 V to 2.2 V. From the theoretical value and the actual measurement value of the discharge capacity, the utilization ratio of the nanoheterostructure was found to be 94%.

Example 3

An inorganic structure (1 cm in diameter×10 μm) was fabricated in the same manner as in Example 1, except that 0.1 g of PS-b-P4VP whose PS component had a number average molecular weight of $180\times10^3$ and a solubility parameter of 9.1 $(cal/cm^3)^{1/2}$, and whose P4VP component had a number average molecular weight of $400\times10^3$ and a solubility parameter of 12.0 $(cal/cm^3)^{1/2}$ was used as a block copolymer, that 0.04 g of lithium bis(trifluoroethyl)dithiocarbamate (LiFDDC, solubility parameter: 8.8 $(cal/cm^3)^{1/2}$), 0.12 g of lanthanum acetylacetonate (La(acac)$_3$, solubility parameter: 9.0 $(cal/cm^3)^{1/2}$), and 0.25 g of titanium tetrachloride (TiCl$_4$, solubility parameter: 9.0 $(cal/cm^3)^{1/2}$) were used as a Li$_{0.5}$La$_{0.5}$TiO$_3$ precursor (a Li precursor, a La precursor, and a Ti precursor), which was a lithium-ion conductor precursor, and that 0.052 g of lithium pyrrolidine dithiocarbamate (LiPDC, solubility parameter: 11.4 $(cal/cm^3)^{1/2}$) and 0.251 g of cobalt pyrrolidine dithiocarbamate (CoPDC, solubility parameter: 11.4 $(cal/cm^3)^{1/2}$) were used as a LiCoO$_2$ precursor (a Li precursor and a Co precursor), which was a positive electrode active substance precursor. Note that THF has a solubility parameter of 9.1 $(cal/cm^3)^{1/2}$.

The obtained inorganic structure was observed with a transmission electron microscope (TEM) in the same manner as in Example 1. A nanoheterostructure was confirmed in which columnar Li$_{0.5}$La$_{0.5}$TiO$_3$ as a lithium-ion conductor was three-dimensionally and periodically arranged in a LiCoO$_2$ matrix as a positive electrode active substance.

Moreover, the small-angle X-ray diffraction pattern of the obtained inorganic structure was measured in the same manner as in Example 1. The distance (d) of the periodic structure was 20.9 nm, and a diffraction peak pattern characteristic to a columnar structure (the ratio of magnitudes (q) of the diffraction spectra at peak positions) was confirmed.

A battery cell was fabricated by sandwiching a poly(ethylene oxide) (PEO) gel electrolyte (1.4 cm in diameter×2 μm) between this nanoheterostructure used as a positive electrode material and lithium metal foil (1 cm in diameter×400 μm) used as a negative electrode material. The discharge capacity of the obtained battery cell was measured in the same manner as in Example 1. From the theoretical value and the actual measurement value of the discharge capacity, the utilization ratio of the nanoheterostructure as the positive electrode material was found to be 94%.

Example 4

An inorganic structure (1 cm in diameter×10 μm) was fabricated in the same manner as in Example 1, except that 0.1 g of PS-b-P4VP whose PS component had a number average molecular weight of 170×10$^3$ and a solubility parameter of 9.1 $(cal/cm^3)^{1/2}$, and whose P4VP component had a number average molecular weight of 340×10$^3$ and a solubility parameter of 12.0 $(cal/cm^3)^{1/2}$ was used as a block copolymer, that 0.08 g of lithium bis(trifluoroethyl)dithiocarbamate (LiFDDC, solubility parameter: 8.8 $(cal/cm^3)^{1/2}$), 0.20 g of aluminum acetylacetonate (Al(acac)$_3$, solubility parameter: 9.0 $(cal/cm^3)^{1/2}$), 0.16 g of germanium acetylacetonate (Ge(acac)$_3$, solubility parameter: 9.0 $(cal/cm^3)^{1/2}$), and 0.20 g of ethyl phosphite (solubility parameter: 8.9 $(cal/cm^3)^{1/2}$) were used as a Li$_{1.5}$Al$_{0.5}$Ge$_{1.5}$(PO$_4$)$_3$ precursor (a Li precursor, an Al precursor, a Ge precursor, and a PO$_4$ precursor), which was a lithium-ion conductor precursor, and that 0.061 g of lithium pyrrolidine dithiocarbamate (LiPDC, solubility parameter: 11.4 $(cal/cm^3)^{1/2}$), 0.23 g of cobalt pyrrolidine dithiocarbamate (CoPDC, solubility parameter: 11.4 $(cal/cm^3)^{1/2}$), and 0.087 g of poly[(4-methoxyphenoxy)(2-(2-methoxyethoxy)ethoxy)(2-allylphenoxy)phosphazene] (solubility parameter: 11.0 $(cal/cm^3)^{1/2}$) were used as a LiCoPO$_4$ precursor (a Li precursor, a Co precursor, and a PO$_4$ precursor), which was a positive electrode active substance precursor.

The obtained inorganic structure was observed with a transmission electron microscope (TEM) in the same manner as in Example 1. A nanoheterostructure was confirmed in which gyroid Li$_{1.5}$Al$_{0.5}$Ge$_{1.5}$(PO$_4$)$_3$ as a lithium-ion conductor was three-dimensionally and periodically arranged in a LiCoPO$_4$ matrix as a positive electrode active substance.

Further, the small-angle X-ray diffraction pattern of the obtained inorganic structure was measured in the same manner as in Example 1. The distance (d) of the periodic structure was 26.1 nm, and a diffraction peak pattern characteristic to a gyroid structure (the ratio of magnitudes (q) of the diffraction spectra at peak positions) was confirmed.

A battery cell was fabricated by sandwiching a PEO gel electrolyte (1.4 cm in diameter×2 μm) between this nanoheterostructure used as a positive electrode material and lithium metal foil (1 cm in diameter×400 μm) used as a negative electrode material. The discharge capacity of the obtained battery cell was measured in the same manner as in Example 1, except that the measurement range was changed to the range from 3 V to 5.5 V. From the theoretical value and the actual measurement value of the discharge capacity, the utilization ratio of the nanoheterostructure as the positive electrode material was found to be 96%.

Example 5

An inorganic structure (1 cm in diameter×10 μm) was fabricated in the same manner as in Example 1, except that 0.1 g of PS-b-P4VP whose PS component had a number average molecular weight of 170×10$^3$ and a solubility parameter of 9.1 $(cal/cm^3)^{1/2}$ and whose P4VP component had a number average molecular weight of 340×10$^3$ and a solubility parameter of 12.0 $(cal/cm^3)^{1/2}$ was used as a block copolymer, that 0.04 g of lithium bis(trifluoroethyl)dithiocarbamate (LiFDDC, solubility parameter: 8.8 $(cal/cm^3)^{1/2}$), 0.12 g of lanthanum acetylacetonate (La(acac)$_3$, solubility parameter: 9.0 $(cal/cm^3)^{1/2}$), and 0.25 g of titanium tetrachloride (TiCl$_4$, solubility parameter: 9.0 $(cal/cm^3)^{1/2}$) were used as a Li$_{0.5}$La$_{0.5}$TiO$_3$ precursor (a Li precursor, a La precursor, and a Ti precursor), which was a lithium-ion conductor precursor, and that 0.032 g of lithium pyrrolidine dithiocarbamate (LiPDC, solubility parameter: 11.4 $(cal/cm^3)^{1/2}$) and 0.41 g of titanium pyrrolidine dithiocarbamate (TiPDC, solubility parameter: 11.4 $(cal/cm^3)^{1/2}$) were used as a Li$_4$Ti$_5$O$_{12}$ precursor (a Li precursor and a Ti precursor), which was a negative electrode active substance precursor used instead of the positive electrode active substance precursor.

The obtained inorganic structure was observed with a transmission electron microscope (TEM) in the same manner as in Example 1. A nanoheterostructure was confirmed in which gyroid Li$_{0.5}$La$_{0.5}$TiO$_3$ as a lithium-ion conductor was three-dimensionally and periodically arranged in a Li$_4$Ti$_5$O$_{12}$ matrix as a negative electrode active substance.

Further, the small-angle X-ray diffraction pattern of the obtained inorganic structure was measured in the same manner as in Example 1. The distance (d) of the periodic structure was 22.1 nm, and a diffraction peak pattern characteristic to a gyroid structure (the ratio of magnitudes (q) of the diffraction spectra at peak positions) was confirmed.

A battery cell was fabricated by sandwiching a PEO gel electrolyte (1.4 cm in diameter×2 μm) between this nanoheterostructure and lithium metal foil (1 cm in diameter×400 μm) used as a counter electrode. The discharge capacity of the obtained battery cell was measured in the same manner as in Example 1, except that the measurement range was changed to the range from 1 V to 2.2 V. From the theoretical value and the actual measurement value of the discharge capacity, the utilization ratio of the nanoheterostructure was found to be 95%.

As described above, the present invention makes it possible to obtain an electrode material having a nanoheterostructure which contains a lithium-ion conductor and an electrode active substance of which one inorganic component is a matrix, and of which the other inorganic component is three-dimensionally and periodically arranged on a predetermined nanoscale.

Such an electrode material of the present invention has a nanostructure, such as a spherical structure, a columnar structure, a gyroid structure, or a lamellar structure, that has not been formed by conventional production methods. It is possible to obtain nanoheterostructures in which the arrangement, composition, structure scale, and the like of various combinations of the lithium-ion conductor and the electrode active substance are controlled in various ways.

The electrode material having such a nanoheterostructure exhibits an interface increasing effect, a nanosize effect, and significant improvements in durability and the like, and consequently makes it possible to improve the utilization ratio as an electrode material for lithium secondary battery. Therefore, the electrode material of the present invention is useful as an electrode material for lithium secondary battery, and especially useful as an electrode material for an all-solid-state lithium secondary battery in which the electrolyte is solid.

What is claimed is:

1. An electrode material for lithium secondary battery comprising a nanoheterostructure which contains a lithium-ion conductor and an electrode active substance of which one inorganic component is a matrix, and of which another inorganic component is three-dimensionally and periodically arranged in the matrix, and has a three-dimensional periodic structure whose average value of one unit length of a repeated structure is 1 nm to 100 nm.

2. The electrode material for lithium secondary battery according to claim 1, wherein the inorganic component three-dimensionally and periodically arranged in the matrix has a shape selected from the group consisting of a columnar shape, a lamellar shape, and a gyroid shape.

3. The electrode material for lithium secondary battery according to claim 1, wherein
the lithium-ion conductor is at least one selected from the group consisting of sulfide-based lithium-ion conductors, garnet-type lithium-ion conductors, LISICON-t e lithium-ion conductors, NASICON-t e lithium-ion conductors, and perovskite-t e lithium-ion conductors.

4. The electrode material for lithium secondary battery according to claim 1, wherein
the electrode active substance is at least one positive electrode active substance selected from the group consisting of oxide-based positive electrode active substances and olivine-type positive electrode active substances.

5. The electrode material for lithium secondary battery according to claim 1, wherein
the electrode active substance is at least one negative electrode active substance selected from the group consisting of oxide-based negative electrode active substances, carbon-based negative electrode active substances, and metal-based negative electrode active substances.

6. A lithium secondary battery comprising the electrode material according to claim 1.

7. A lithium secondary battery comprising the electrode material according to claim 4 as a positive electrode material.

8. A lithium secondary battery comprising the electrode material according to claim 5 as a negative electrode material.

9. A method for producing an electrode material for lithium secondary battery of which one inorganic component is a matrix, and of which another inorganic component is three-dimensionally and periodically arranged in the matrix, and has a three-dimensional periodic structure whose average value of one unit length of a repeated structure is 1 nm to 100 nm, the method comprising:

a first step of preparing a raw material solution by dissolving, in a solvent,
a block copolymer comprising at least a first polymer block component and a second polymer block component which are immiscible but linked to each other,
a first inorganic precursor which is one of a lithium-ion conductor precursor and an electrode active substance precursor, and
a second inorganic precursor which is the other of the lithium-ion conductor precursor and the electrode active substance precursor; and a second step including
a phase-separation treatment for forming a nanophase-separated structure in which at least a first polymer phase comprising the first polymer block component with the first inorganic precursor introduced thereinto and a second polymer phase comprising the second polymer block component with the second inorganic precursor introduced thereinto are regularly arranged by self-assembly,
a conversion treatment for converting the lithium-ion conductor precursor and the electrode active substance precursor to a lithium-ion conductor and an electrode active substance, respectively, and
a removal treatment for removing the block copolymer from the nanophase-separated structure, to thereby obtain an electrode material having a nanoheterostructure comprising the lithium-ion conductor and the electrode active substance.

10. The method for producing an electrode material for lithium secondary battery according to claim 9, wherein
a solubility parameter difference between the first inorganic precursor and the first polymer block component is 2 $(cal/cm^3)^{1/2}$ or less, and a solubility parameter difference between the second inorganic precursor and the second polymer block component is 2 $(cal/cm^3)^{1/2}$ or less.

11. The method for producing an electrode material for lithium secondary battery according to claim 9, wherein
a solubility parameter difference between the first polymer block component and the first inorganic precursor is smaller than a solubility parameter difference between the first polymer block component and the second inorganic precursor.

12. The method for producing an electrode material for lithium secondary battery according to claim 9, wherein
a solubility parameter difference between the second polymer block component and the second inorganic precursor is smaller than a solubility parameter difference between the second polymer block component and the first inorganic precursor.

13. The method for producing an electrode material for lithium secondary battery according to claim 9, wherein
the block copolymer comprises at least one first polymer block component and at least one second polymer block component which are linked to each other, the first polymer block component being selected from the group consisting of a polystyrene component, a polyisoprene component, and a polybutadiene component, the second polymer block component being selected from the group consisting of a poly(methyl methacrylate) component, a poly(ethylene oxide) component, a polyvinylpyridine component, and a poly(acrylic acid) component, the first inorganic precursor is at least one of organometallic compounds and organometalloidal compounds having at least one structure selected from the group consisting of a phenyl group, long hydrocarbon chains having 5 or more carbon atoms, a cyclooctatetraene ring, a cyclopentadienyl ring, and an amino group, and the second inorganic precursor is at least one selected from the group consisting of salts of metals or metalloids, metal- or metalloid-containing alkoxides having 1 to 4 carbon atoms, and metal or metalloid acetylacetonate complexes.

\* \* \* \* \*